June 19, 1962   J. EGGERT ETAL   3,039,359
TRIPLET LENS OBJECTIVE ASSEMBLY
Filed March 10, 1961
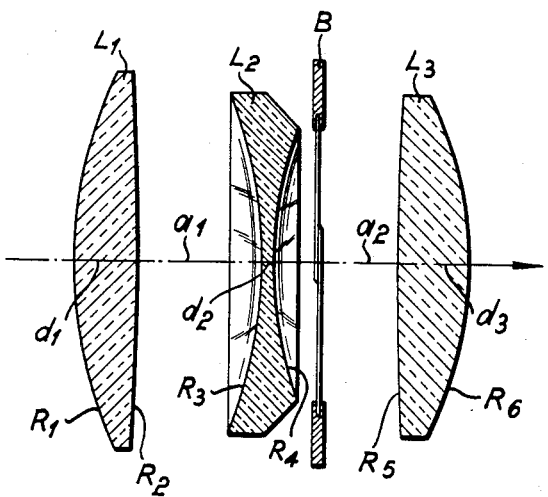
INVENTORS
Joachim Eggert
Ernst Tronnier
BY Blum, Moscovitz, Friedman & Blum
ATTORNEYS

United States Patent Office 3,039,359
Patented June 19, 1962

3,039,359
TRIPLET LENS OBJECTIVE ASSEMBLY
Joachim Eggert and Ernst Tronnier, Braunschweig, Germany, assignors to Voigtlander A.G., Braunschweig, Germany, a corporation of Germany
Filed Mar. 10, 1961, Ser. No. 94,750
1 Claim. (Cl. 88—57)

This invention relates to triplet objective lenses and, more particularly, to a high speed lens of this type having a correction factor particularly suiting it for photography, as well as having an image field with a diameter of about 55 per cent of the equivalent focal length, particularly suiting it for use in a projector.

There have been many designs of triplet objective lenses including two condensing lenses and a bi-concave or dispersing negative lens. A known type of such lens includes a pair of outer condensing lenses of heavy crown glass and a dispersing central lens of flint glass, in order to provide the requisite spherical, chromatic, astigmatic and comatic correction.

The present invention is directed to a lens of this latter type of design in which the cost is very substantially reduced without any adverse effect on the quality of the image definition. While heavy crown glasses are used for the condensing outer lenses, the refraction indices of these are higher than that of known objective lenses of this type. In further accordance with the invention, the negative central lens is made of a heavy flint glass.

For an understanding of the principles of the invention, reference is made to the following description of a typical embodiment thereof as illustrated in the accompanying drawing. In the drawing, the single FIGURE is an axial sectional view of a triplet lens embodying the invention, on a scale of approximately 2:1.

In the drawing, the arrow indicates the direction of the light through the objective from the side of the longer conjugate toward the side of the shorter conjugate and also the optical axis thereof. The objective is illustrated as comprising condensing lenses $L_1$ and $L_3$ between which is located a bi-concave lens $L_2$. A diaphragm B is located between lenses $L_2$ and $L_3$. The radii of the lenses, proceeding in the direction of light rays through the objective, are designated $R_1$ through $R_6$, and the axial thicknesses of the lenses are designated, in the same direction of light, $d_1$, $d_2$, and $d_3$. The axial air gaps between the lenses, considered in the same direction of the light through the objective, are designated $a_1$ and $a_2$.

The limiting structural data of an objective embodying the invention are given in the following table, with reference to the equivalent focal length ($f$) of the objective:

$0.42f < R_1 < 0.46f$
$4f < -R_2 < 8f$
$0.42f < -R_3 < 0.45f$
$0.36f < R_4 < 0.39f$
$1.0f < R_5 < 2.0f$
$0.36f < -R_6 < 0.39f$
$0.06f < d_1 < 0.08f$
$0.11f < a_1 < 0.14f$
$0.007f < d_2 < 0.01f$
$0.11f < a_2 < 0.14f$
$0.06f < d_3 < 0.08f$

A specific example of an objective embodying the invention, having a relative aperture of 1:2.8, and as referred to a normal focal length of $f=100$ mm., is given in the following table:

[1:2.8  $f=100.0$  $s_1=84.75$]

| | | | |
|---|---|---|---|
| $R_1=+43.19$ | $d_1=6.30$ | $n_1=1.6385$ | $\nu_1=55.5$ |
| $R_2=-453.55$ | $a_1=12.65$ | | |
| $R_3=-43.95$ | $d_2=0.85$ | $n_2=1.6461$ | $\nu_2=34.0$ |
| $R_4=+37.63$ | $a_2=12.41$ | | |
| $R_5=+166.96$ | $d_3=7.00$ | $n_3=1.6204$ | $\nu_3=60.3$ |
| $R_6=-36.70$ | | | |

In the immediately foregoing table, $n$ is the index of refraction of the lens material as referred to the yellow helium line, and $\gamma$ is the Abbe number.

While a specfic embodiment of the invention has been shown and described in detail in order to illustrate the application of the principles of the invention, it will be understood that the invention may be embodied otherwise without departing from such principles.

What is claimed is:

A photographic objective consisting of three serially arranged coaxial and axially spaced lenses including, in the direction of light rays entering the objective from the side of the longer conjugate toward the side of the shorter conjugate, a convergent front lens, an intermediate divergent lens, and a convergent rear lens; said objective, at a relative aperture of 1:2.8, covering an image field having a diameter which is about 55 per cent of the equivalent focal length ($f$); said lenses, with the sub-numbers arranged in ascending order in the direction of light rays through the objective, having, for a focal length of 100 mm., the following values of lens radii (R), lens thicknesses ($d$), axial air spaces ($a$) between the lenses, indices of refraction ($n$), for the lens material as referred to the $d$-line of the helium spectrum, and Abbe-numbers ($\gamma$) representing the dispersion of the lens material:

| | | | |
|---|---|---|---|
| $R_1=+43.19$ | $d_1=6.30$ | $n_1=1.6385$ | $\nu_1=55.5$ |
| $R_2=-453.55$ | $a_1=12.65$ | | |
| $R_3=-43.95$ | $d_2=0.85$ | $n_2=1.6461$ | $\nu_2=34.0$ |
| $R_4=+37.63$ | $a_2=12.41$ | | |
| $R_5=+166.96$ | $d_3=7.00$ | $n_3=1.6204$ | $\nu_3=60.3$ |
| $R_6=-36.70$ [1] | | | |

[1] The indices of refraction are referred to the yellow helium line.

References Cited in the file of this patent
FOREIGN PATENTS 155,640    Great Britain _____ Dec. 22, 1920